United States Patent [19]

Assaf et al.

[11] Patent Number: 4,932,250

[45] Date of Patent: Jun. 12, 1990

[54] MULTI POINT SENSOR

[75] Inventors: Farouk A. Assaf, Banchory; Leslie Robertson; David J. Watmough, both of Foresterhill, all of Scotland

[73] Assignee: Aberdeen University, Scotland

[21] Appl. No.: 220,014

[22] Filed: Jul. 15, 1988

[30] Foreign Application Priority Data

Dec. 3, 1987 [GB] United Kingdom ................. 8728308

[51] Int. Cl.$^5$ .............................................. G01F 1/68
[52] U.S. Cl. .............................. 73/204.24; 73/861.95; 73/643; 374/32
[58] Field of Search ........... 73/204.24, 204.18, 861.95; 374/32, 113, 137, 166, 179

[56] References Cited

U.S. PATENT DOCUMENTS

| | | | |
|---|---|---|---|
| 2,540,822 | 2/1951 | Hastings | 73/204.24 |
| 2,924,974 | 2/1960 | Dalglish | 374/166 |
| 3,030,806 | 4/1962 | Davis | 73/204.24 |
| 3,336,804 | 8/1967 | Poppendiek et al. | 73/204.24 |
| 3,592,055 | 7/1971 | Dorman | 73/204.24 |
| 3,738,168 | 6/1973 | Mansell | 374/32 |
| 4,241,303 | 12/1980 | Thompson | 73/179 |
| 4,242,907 | 1/1981 | Kasmierowicz | 374/137 |

Primary Examiner—Herbert Goldstein
Attorney, Agent, or Firm—Ostrolenk, Faber, Gerb & Soffen

[57] ABSTRACT

The invention provides a thermocouple device comprising a base wire 1 and a plurality of junctions 3 spaced along said wire, each of said junctions being connected to a monitoring means which provides a visual indication of the temperature at each junction 3. A heating coil 2 or energy absorbative material may be disposed along the length of the base wire 1 to assist in detection of liquid flow, ultrasonic flux or bubble presence.

7 Claims, 2 Drawing Sheets

MULTI POINT SENSOR

BACKGROUND OF THE INVENTION

The present invention relates to a multi point sensor and particularly a multi point sensor for sensing ultrasound energy, liquid velocity or the presence or absence of bubbles in a liquid.

Thermocouples have long been available for monitoring temperature values. The concept however of using thermocouple arrays to measure real time ultrasound intensity profiles (and hence ultrasound output) from an ultrasound transducer is not comprehended in the art. Further the measurement of liquid velocity profiles in a conduit utilizing these arrays is not known.

BRIEF DESCRIPTION OF THE INVENTION

Referring therefore to a first aspect of the present invention there is provided a thermocouple device comprising a base wire and a plurality of junctions spaced at predetermined locations along said wire, each of said junctions being connected to a monitoring means which provides a visual indication of the temperature at each junction. Such a thermocouple device may additionally be provided with a heating coil disposed along the length of the base wire so that the whole device may be raised to a predetermined temperature in situ.

In a preferred form of the invention the junctions, having been welded rather than soldered, are encapsulated with a non-toxic energy absorbing resin, such as an epoxy resin so as to preferentially absorb heat from the surrounding fluid.

The monitoring means may comprise a signal amplifier, a linearizer and an electronic temperature compensator. The monitoring means preferably is provided with a light emitting diode (LED) bar graph linked to a suitable driver whereby either the LED operates in dot mode wherein a single diode is actuated in response to a given value of input signal, or in bar mode wherein a plurality of diodes are actuated as a function of the strength of the input signal.

The device of the invention may be utilized with an ultrasound monitoring apparatus comprising means for securing an ultrasound transducer along an axis, means for securing the thermocouple array perpendicular to said axis and spaced by a predetermined distance from said transducer, said monitoring means being adapted to display the energy absorbed at each junction as a visual indication of transducer output at a predetermined distance from the axis.

In a preferred form of the invention the linear thermocouple array and the transducer are adapted to be surrounded by a suitable ultrasonic sound transmitting liquid such as water.

The invention also comprehends a method for the estimation of liquid flow in a conduit which method comprises the steps of disposing an assembly of the base wire and the heating coil as just described in a conduit, raising the temperature of the heating wire to a given value in a still liquid, and recording the observed change in visual indication on liquid flow. The base wire may be axially disposed in the conduit. In this circumstance liquid flow can be deduced by the introduction of a bubble into the liquid upstream of a thermocouple device; the time interval between linear expressions of a disturbance at successive thermocouple junctions being a measure of the time taken for the passage of a bubble over the junction.

In an alternative embodiment, the base wire is disposed perpendicular to the conduit, said base wire being provided with a heating coil to heat the thermocouple device to a predetermined temperature in a liquid contained within the conduit. The fall in temperature occurring as a function of liquid flow rate is then measured to give an indication of liquid velocity.

The thermocouples of the invention comprise therefore a base wire with a plurality of spaced junctions thereupon. If a heating wire is used such an arrangement will also become an efficient bubble detector since the presence of a bubble at a junction prevents cooling of the junction at which the bubble is located by the liquid stream and hence the temperature at junction will rise. This may be observed on a bar chart or on any visual indication means.

BRIEF DESCRIPTION OF THE DRAWINGS

The aspects of the present invention will now be described by way of illustration only, with reference to the accompanying drawings.

DETAILED DESCRIPTION OF THE PREFERRED EMBODIMENTS

Figure 1:
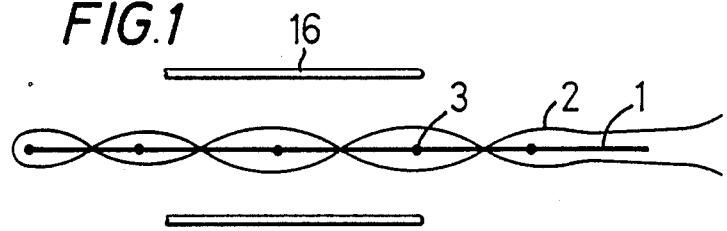
FIG. 1 shows a plan diagrammatic view of a thermocouple device according to the present invention with a heater wire in situ.
Figure 2:
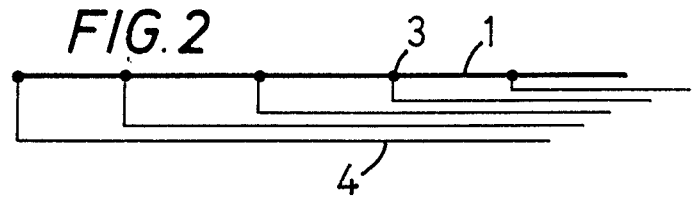
FIG. 2 shows a side view of a thermocouple with a junction wire, but excluding the heater wire.

With reference to FIGS. 1 and 2, a base thermocouple wire 1 is provided with a plurality of junctions 3 at equally spaced intervals throughout its length. One or more heating elements 2 are preferably provided to heat the thermocouple junctions 3 to a predetermined temperature. The junctions 3 may be welded or soldered to respective copper wires 4 which transfer the output signals to the monitoring means. The thermocouple wire 1 may be a constantan wire, and the array may be positioned in a small bore biocompatible tube having, for example, a bore of 1 mm and being formed, for example, of polytetrafluoroethylene with a wall thickness of, for example 0.1 to 0.3 mm. However, in many conduits 16 where the liquid is not corrosive to the thermocouple, the thermocouple may be utilized without a covering.

Figure 3:
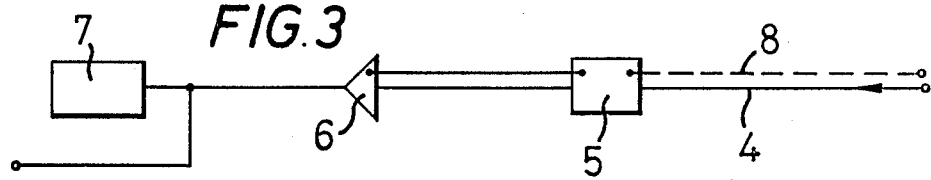
FIG. 3 shows a diagrammatic plan view of a signal monitor.

As shown in FIG. 3, each junction wire 4 is connected to its own amplifier 6 which in turn is connected to an LED display 7. The thermocouple amplifier 6 is temperature compensated by a compensator 5 acted upon by a compensator circuit input 8.

Each junction 3 is individually connected to an arrangement shown in FIG. 3. As the signal generated at the junction 3 rises, the value of the input signal received by the thermocouple amplifier 6 also rises thereby actuating the LED display to show a higher value. Thus, with reference to FIG. 4 an LED display 9 shows a series of bar graphs 10, each bar being connected to a respective single junction point. It will be observed that the centre bar has four LEDs actuated whereas the first and last bars have only one actuated. This means that the major portion of a signal is to be found axially, or centrally, of an elongate thermocouple device.

Figure 6:
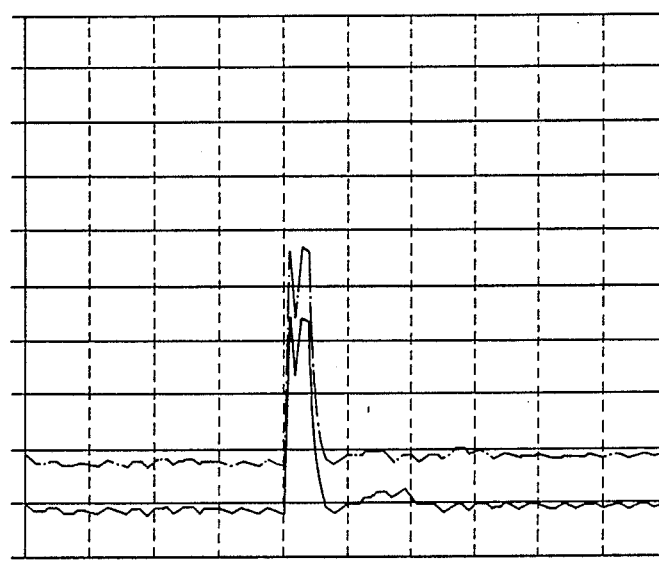
FIG. 6 shows a graph of a signal output of a device according to the present invention in bubble detection mode.

With reference to FIG. 6, the arrangement of FIGS. 1 and 2 can be utilized in a bubble detection mode. As previously explained, the presence of a bubble at a thermocouple junction causes the temperature at that junction to rise by a significant amount. This is shown in FIG. 6 where a temperature rise indicative by the presence of a bubble is shown on a temperature chart. It will be appreciated that the introduction of a single bubble into a liquid stream will also enable the bubble's velocity to be measured, and hence will enable the liquid flow velocity to be measured.

Figure 5:
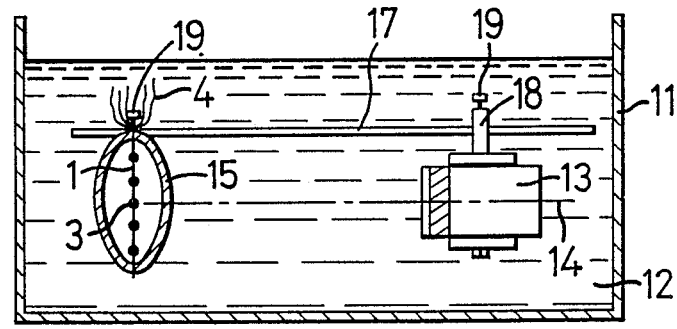
FIG. 5 shows a diagrammatic side elevation of an ultrasound monitoring device according to the invention.

Turning now to the embodiment of FIG. 5, there is provided a liquid tight enclosure 11 which may optionally contain water 12. Although the term "water" is used hereinafter, it will be appreciated that any ultrasound transmitting fluid can be used. Thus, the enclosure 11 may be utilized without liquid (i.e. in air-based mode) if desired. By controlling the water bath temperature the device may be made to measure ultrasound intensity in a quantitative fashion.

The enclosure 11 supports a transducer 13 under test; the transducer being aligned along an axis 14 by means of a clamping rig 18 which locates the transducer 13 accurately on the axis 14. The rig 18 is secured to a support bar 17 by a nut 19.

Figure 4:
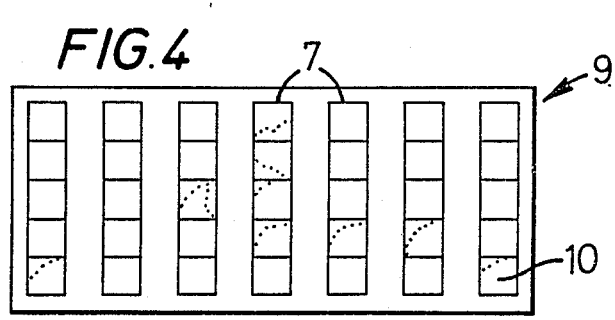
FIG. 4 is a side elevation of a bar graph display for use in the present invention.

Accurately spaced apart from the transducer 13 on the support bar 17 is a supporting annulus 15 disposed coaxially of the axis 14. The annulus 15 is secured to the support bar 17 by its own nut 19. A base thermocouple wire 1 is disposed diametrically across the supporting anulus 15. In use the wire 1 is connected via junction wires 4 to LEDs 7 as shown in FIG. 4. Actuation of the ultrasound transducer 13 causes an ultrasound flux to strike the thermocouple junctions 3 and increase their temperature. For reasons of symmetry an odd number of junctions 3 is preferred. This causes the LED display 9 to show bar charts dependent upon the signal strength exerted by the transducer 13.

Malignant neoplasms are often treated by hyperthermia induced by ultrasound. In order to accurately position the transmitted ultrasound, transducers must be operating in their correct modes and must output a hyperthermia inducing radiation. Use of the arrangement of FIG. 5 makes it possible to rapidly check a single transducer or an array of transducers to ensure their compliance with a predetermined treatment pattern.

The device as described above may also be used to measure temperature gradients in materials such as bread, dough and other soft solids and liquids. In this case, of course, no heater is strictly necessary. Similarly, of course, the device may be utilized to measure skin temperature in medical situations and by application of the heater may be utilized to assess blood flow in an artery or vein.

The device may also utilized to determine "time of death" of corpses by insertion of the array placed in a sheath into the body. For times of death up to a few hours the gradient of temperature will be given and this provides an estimate of how long the body had been cooling.

We claim:

1. A fluid flow measuring device comprising a base wire and a plurality of thermocouple junctions spaced along said wire, a heating element disposed along the length of the base wire and adapted to heat all of said thermocouple junctions, each said junction being connected to monitoring means which provides a visual indication of the respective temperature at each junction.

2. A fluid flow measuring device according to claim 1 wherein said junctions are encapsulated with a nontoxic heat absorbing resin.

3. A fluid flow measuring device according to claim 1 wherein said monitoring means comprises a plurality of monitoring circuits, each said circuit including a signal amplifier, a linearizer and an electronic temperature compensator.

4. A fluid flow measuring device according to claim 1 wherein said heating element raises the temperature of said thermocouple junctions to a given value in still liquid.

5. A method for the estimation of liquid flow in a conduit, said method comprises the steps of:
   disposing a base wire having a plurality of thermocouple junctions spaced along said wire and a heating element disposed along the length of said wire and adapted to heat all of said thermocouple junctions in said conduit;
   raising the temperature of said thermocouple junctions to a given value in still liquid; and thereafter
   causing said liquid to flow through said conduit and monitoring the change in the temperature at each said junction as said liquid flows through said conduit.

6. A method according to claim 5 wherein said base wire extends along an axis of said conduit, and wherein said monitoring step comprises the steps of:
   introducing a bubble into said liquid upstream of said thermocouple junctions such that said bubble successively comes into contact with each successive junction and thereby causes the temperature at each successive said junction to momentarily rise; and
   monitoring the time interval between said momentary rises in the temperature at successive said junctions, said time interval being indicative of the speed at which said bubble moves through said conduit.

7. A method according to claim 5 wherein said base wire and heating element are disposed parallel to the direction of flow of said liquid and wherein said monitoring step comprises the step of measuring the fall in temperature at said thermocouples due to an increase in liquid flow rate.

* * * * *